US010635320B2

(12) United States Patent
Zhai et al.

(10) Patent No.: US 10,635,320 B2
(45) Date of Patent: Apr. 28, 2020

(54) INTEGRATOR FOR A STORAGE DEVICE, CORRESPONDING STORAGE DEVICE AND METHOD OF MANUFACTURING THE SAME

(71) Applicant: EMC IP Holding Company LLC, Hopkinton, MA (US)

(72) Inventors: Haifang Zhai, Shanghai (CN); Hendry Wu, Shanghai (CN); David Dong, Shanghai (CN); Yujie Zhou, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/171,958

(22) Filed: Oct. 26, 2018

(65) Prior Publication Data
US 2019/0171358 A1   Jun. 6, 2019

(30) Foreign Application Priority Data
Oct. 27, 2017   (CN) .......................... 2017 1 1023143

(51) Int. Cl.
*G06F 3/06*   (2006.01)
*G06F 13/40*   (2006.01)
*G06F 13/42*   (2006.01)

(52) U.S. Cl.
CPC ............ *G06F 3/061* (2013.01); *G06F 3/0655* (2013.01); *G06F 3/0679* (2013.01); *G06F 13/4022* (2013.01); *G06F 13/4221* (2013.01); *G06F 13/4234* (2013.01); *G06F 2213/0008* (2013.01); *G06F 2213/0026* (2013.01); *G06F 2213/0028* (2013.01)

(58) Field of Classification Search
CPC . G06F 3/06; G06F 13/40; G06F 13/42; G06F 2213/0008; G06F 2213/0026; G06F 2213/0028
USPC .......................................... 710/154; 711/154
See application file for complete search history.

(56) References Cited

U.S. PATENT DOCUMENTS

| 2013/0163611 | A1* | 6/2013 | Armstrong | H04L 47/78 370/437 |
| 2013/0215754 | A1* | 8/2013 | Tripathi | H04L 49/253 370/236 |
| 2013/0235870 | A1* | 9/2013 | Tripathi | H04L 41/5019 370/390 |
| 2013/0242983 | A1* | 9/2013 | Tripathi | H04L 49/25 370/355 |
| 2015/0032932 | A1* | 1/2015 | Chang | G06F 13/00 710/308 |

(Continued)

*Primary Examiner* — Christopher B Shin
(74) *Attorney, Agent, or Firm* — Ryan, Mason & Lewis, LLP (57) ABSTRACT

The present disclosure relates to an integrator for a storage device, a corresponding storage device and a method of manufacturing the same. The integrator comprises a base board comprising a first interface and a second interface; a connector coupled to the first interface of the base board, the connector being connectable with at least one server in the storage device; an input/output (I/O) part coupled to the second interface of the base board and connectable with an I/O device; and a switcher arranged on the base board and adapted to exchange data between the first interface and the second interface to support data transmission of the I/O device or other servers with the server via the integrator.

20 Claims, 5 Drawing Sheets

(56) References Cited

U.S. PATENT DOCUMENTS

| | | | |
|---|---|---|---|
| 2015/0052282 A1* | 2/2015 | Dong | G06F 13/32 |
| | | | 710/308 |
| 2017/0068628 A1* | 3/2017 | Calciu | G06F 13/4022 |
| 2017/0242771 A1* | 8/2017 | Khemani | G06F 11/2094 |
| 2018/0011812 A1* | 1/2018 | Morishita | G06F 3/0658 |
| 2018/0165148 A1* | 6/2018 | Watanabe | G06F 3/0604 |
| 2018/0213669 A1* | 7/2018 | Kochukunju | H05K 7/1485 |
| 2018/0329840 A1* | 11/2018 | Tashima | G06F 13/24 |
| 2019/0042509 A1* | 2/2019 | Buhlman | G06F 3/0631 |

* cited by examiner

INTEGRATOR FOR A STORAGE DEVICE, CORRESPONDING STORAGE DEVICE AND METHOD OF MANUFACTURING THE SAME

RELATED APPLICATIONS

This application claims priority from Chinese Patent Application Number CN 201711023143.4, filed on Oct. 27, 2017 at the State Intellectual Property Office, China, titled "INTEGRATOR FOR A STORAGE DEVICE, CORRESPONDING STORAGE DEVICE AND METHOD OF MANUFACTURING THE SAME" the content of which is herein incorporated by reference in its entirety.

FIELD

Embodiments of the present disclosure generally relate to the field of storage devices, and more specifically, to an integrator for a storage device.

BACKGROUND

In the current condition of continuous development of storage technology, Input/Output (I/O) devices that support various protocols, such as Peripheral Component Interconnect Express (PCIe) protocol, Ethernet protocol, Serial SCSI (SAS) protocol, Fiber Channel (FC) protocol, Infiniband (IB) protocol and non-volatile memory (NVME) protocol become increasingly varied. In application, these I/O devices should generally be connected with ports of a server that support corresponding protocols. However, the number of ports of the server that support various protocols is limited. Besides, the limited number of ports in the server has severely hampered function expansion of the server, or even the storage device and storage system. In addition, too many I/O devices connected to the server would also make the internal and external space of the server too crowded, resulting in a serious heat dissipation problem for the server, the storage device and the storage system.

SUMMARY

Embodiments of the present disclosure provide an integrator for use in a storage device.

In a first aspect, an integrator for a storage device is provided. The integrator comprises a base board comprising a first interface and a second interface; a connector coupled to the first interface of the base board, the connector being connectable with at least one server in the storage device; an input/output (I/O) part coupled to the second interface of the base board and connectable with an I/O device; and a switcher arranged on the base board and adapted to exchange data between the first and second interfaces to support data transmission of the I/O device or other servers with the server via the integrator.

In some embodiments, the connector is compliant with Peripheral Component Interconnect Express (PCIe) protocol.

In some embodiments, the I/O part is compliant with at least one of the following protocols: PCIe protocol, Ethernet protocol, Serial SCSI (SAS) protocol, Fiber Channel (FC) protocol, Infiniband (IB) protocol, small input/output card (SLIC) protocol and non-volatile memory (NVME) protocol.

In some embodiments, the switcher comprises a plurality of PCIe switch chips.

In some embodiments, the PCIe switch chips exchange data with each other via a non-transparent bridge (NTB).

Some embodiments further comprise a heat radiator for dissipating heat for the integrator.

Some embodiments further comprise a power supply module coupled to the base board for powering the integrator.

In a second aspect of the present disclosure, a storage device is provided, comprising a plurality of servers; a plurality of I/O devices; and the integrator described above.

In a third aspect of the present disclosure, a method for manufacturing an integrator for a storage device is provided, comprising: providing a base board comprising a first interface and a second interface; coupling a connector to the first interface of the base board, the connector being connectable with at least one server in the storage device; coupling an input/output (I/O) part to the second interface of the base board, the I/O part being connectable with an I/O device; and arranging a switcher on the base board, the switcher being adapted to exchange data between the first and second interfaces to support data transmission of the I/O device or other servers with the server via the integrator.

It should be appreciated that the Summary part does not intend to indicate essential or important features of embodiments of the present disclosure or to limit the scope of the present disclosure. Other features of the present disclosure will be more comprehensible with the following depiction.

BRIEF DESCRIPTION OF THE DRAWINGS

The above and other objectives, features and advantages of embodiments of the present disclosure will become more apparent from the following detailed depiction of the drawings. For illustrative purposes only, multiple embodiments of the present disclosure are described hereby in a non-limiting manner with reference to accompanying drawings, in which.

DETAILED DESCRIPTION OF EMBODIMENTS

Principles of the present disclosure will be described with reference to various example embodiments illustrated in the drawings. It is to be understood that these embodiments are only provided to enable those skilled in the art to better understand and further implement the present disclosure, rather than to limit the scope of the present disclosure in any manner. It is to be understood that the same or similar reference signs may be used in the figures where possible, and the same or similar reference signs may represent the same or similar functions. Those skilled in the art shall realize easily that from the following depiction, alternative embodiments of the structure and method illustrated in the present disclosure may be utilized without departing from the principles of the present disclosure described herein.

As used herein, the term "comprises" and its variants are to be read as open-ended terms that mean "comprises, but is not limited to." The term "based on" is to be read as "based at least in part on." The term "one example embodiment" is to be read as "at least one example embodiment." The term "another embodiment" is to be read as "at least one another embodiment."

In a traditional solution, multiple servers are configured in a storage device, such as a rack. The servers exchange data via an input/output (I/O) device with the outside, such as other servers in the storage device, servers or I/O devices in the other storage devices or any other types of I/O devices. Thus, the servers need to be arranged with ports that support various protocols and plugged with the corresponding I/O devices to accomplish the above tasks. In this event, there is another problem that sometimes it is necessary to access each other through a complicated link between different servers in the same storage device, thus lowering the I/O efficiency of the storage device.

Besides, nowadays, with the continuous development of storage technology of the storage device, a plurality of input/output (I/O) devices that support various protocols, such as Peripheral Component Interconnect Express (PCIe) protocol, Ethernet protocol, Serial SCSI (SAS) protocol, Fiber Channel (FC) protocol, Infiniband (IB) protocol, small input/output card (SLIC) protocol and non-volatile memory (NVME) protocol have emerged. I/O devices that enable the storage device to support more protocols become a general trend. However, the size and the internal and external space of the server are limited. Therefore, to be compatible with as many I/O devices as possible, more ports have to be developed and more devices have to be plugged within the limited space of the server.

This causes various problems. For example, too many ports and various devices plugged in the ports make the internal and external space of the server very crowded, so that heat emitted by devices and internal components of the server cannot be circulated effectively, resulting in continuous temperature rise inside the server and outside the server, namely, inside the storage device. Too high temperature would cause various I/O devices and internal components, temperature-sensitive elements in particular, of the server to be damaged prematurely, thus affecting the normal operation of the server or even the storage device.

Additionally, it impossible to accommodate various currently common I/O devices in the limited space of the server. The user can at most configure several customary port types on the server. Therefore, when it is necessary to exchange data with some specific I/O device, if the port required for plugging the specific I/O device is not reserved in advance in the server (this situation is common), the normal operation of the storage device will be affected.

I/O devices, such as a standard serial connected small computer system interface (SAS) disk array enclosure (DAE) or non-volatile memory express (NVME) disk cluster (JBOF), need to be plugged into particular servers and particular ports to operate, which makes the internal and external space of the server that originally failed to meet the requirement of normal use even more cramped.

Figure 1:
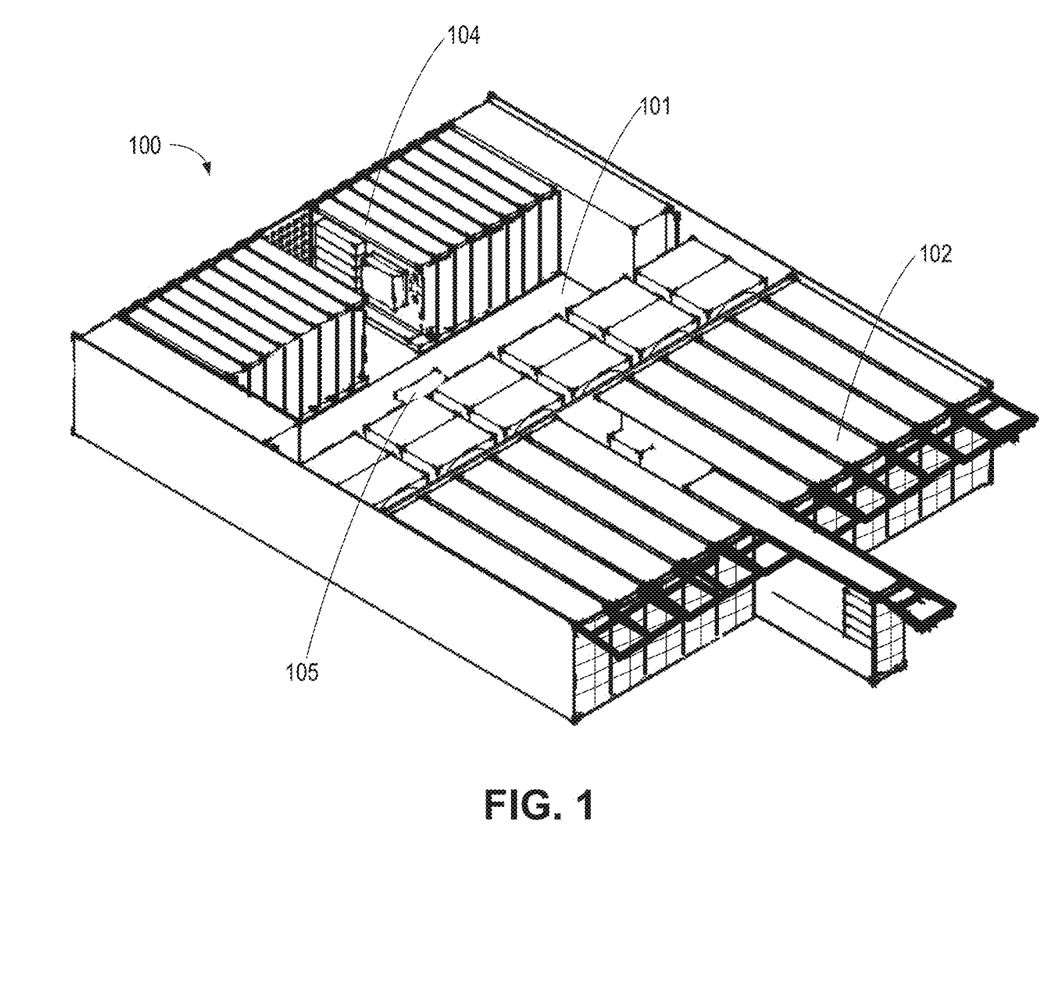
FIG. 1 shows a perspective view of an integrator in accordance with example embodiments of the present disclosure.
Figure 2:
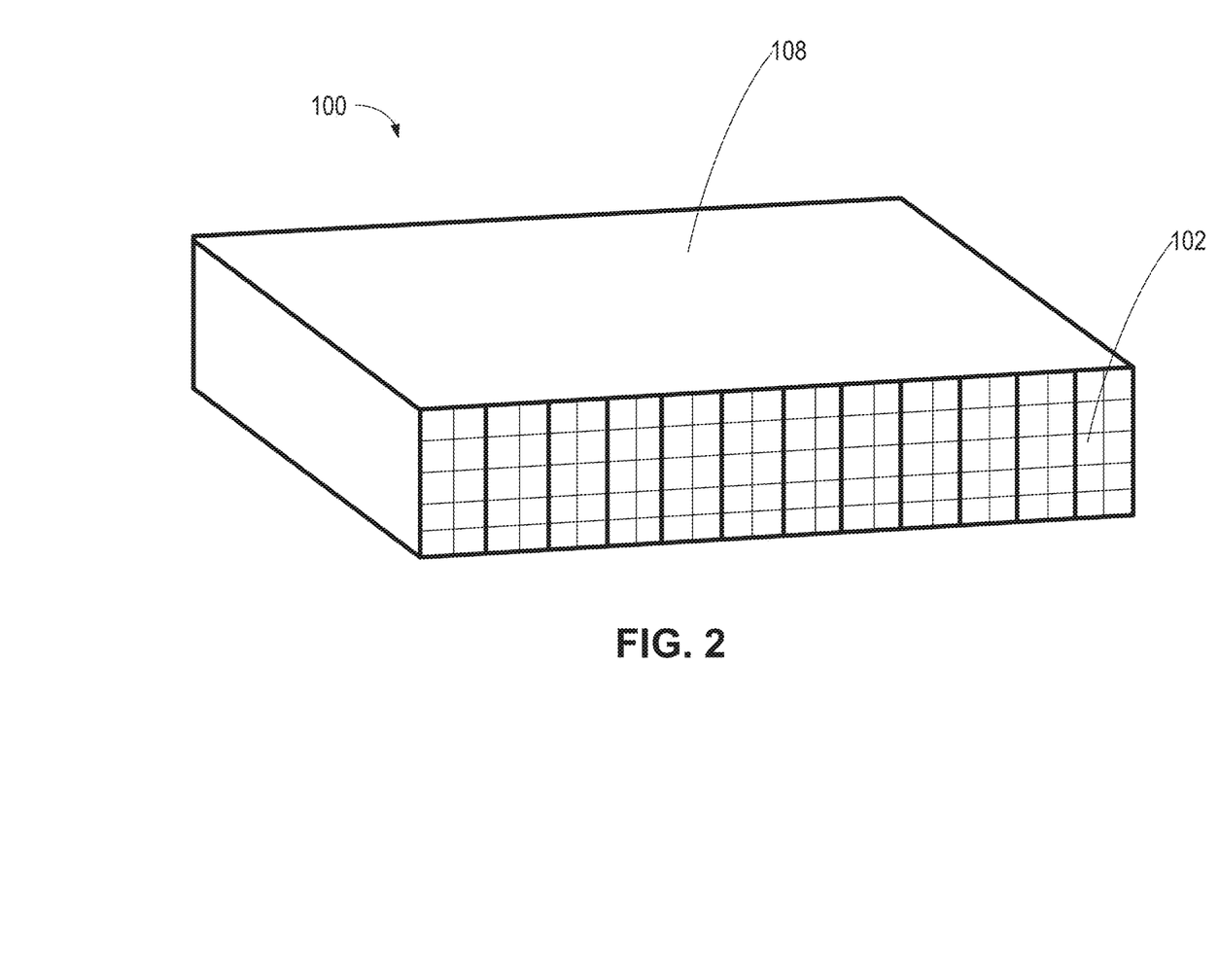
FIG. 2 shows a perspective view of an integrator in accordance with example embodiments of the present disclosure, wherein an integrator case for accommodating the integrator is illustrated.

The structure and principle of the integrator in accordance with example embodiments of the present disclosure will be described in detail with reference to FIGS. 1-2. FIG. 1 shows a perspective view of the integrator according to example embodiments of the present disclosure. For ease of depiction, the top cover of the integrator shown in FIG. 1 is removed. FIG. 2 shows a perspective view of the integrator according to example embodiments of the present disclosure.

Figure 4:
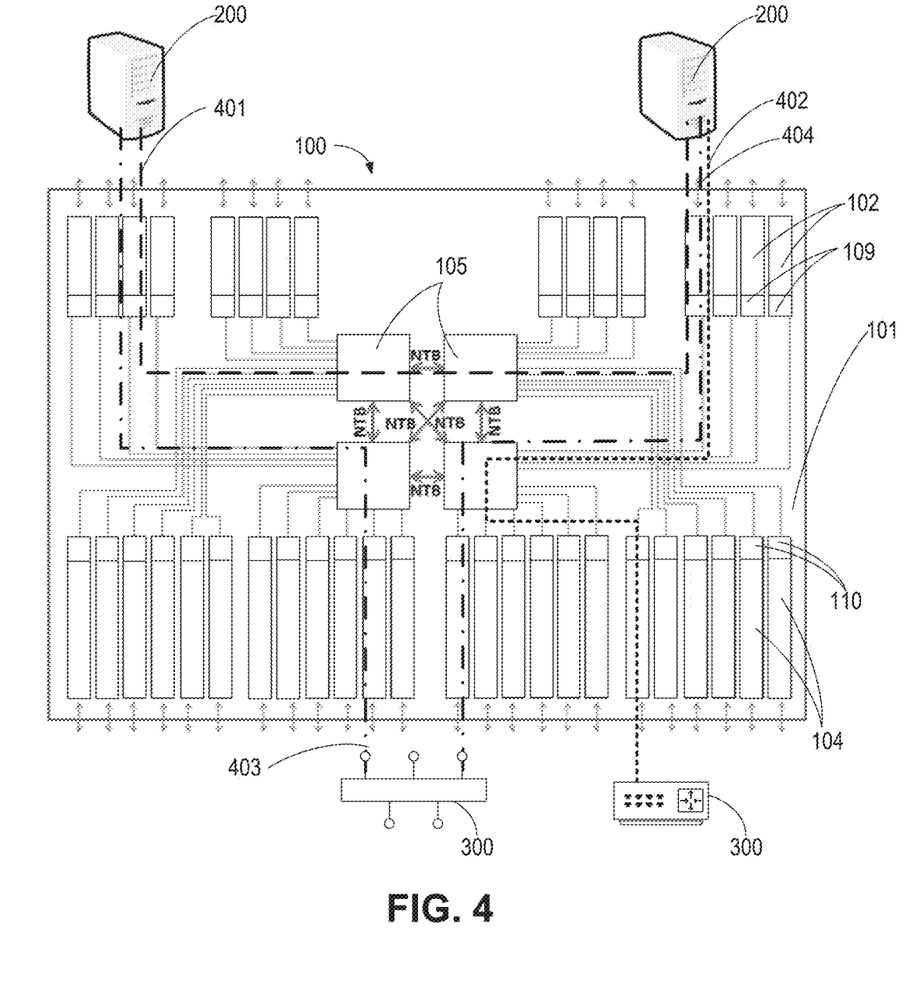
FIG. 4 shows a principle block diagram of a storage device in accordance with example embodiments of the present disclosure.

As shown in FIG. 1, in general, the integrator 100 described herein for a storage device, such as a rack, comprises a base board 101, a connector 102, an I/O part 104 and a switcher 105. The base board 101 is provided with at least two interfaces (for ease of depiction, referred to as first interface 109 and second interface 110 hereinafter, as shown in FIG. 4). The first interface 109 and the second interface 110 may be arranged on two opposite sides of the base board 101. This arrangement makes it more convenient to use the integrator 100.

The connector 102 is coupled to the first interface 109 and can be connected with a server 200 (FIG. 4) by wire or wirelessly. The I/O part 104 is coupled to the second interface 110 and can be connected with an I/O device 300 (FIG. 4). The switcher 105 is arranged on the base board 101 and can perform data exchange between the first and second interfaces 109, 110, so that the I/O device 300 or servers 200 in the same storage device or in other storage devices can transmit data with the other server 200 via the integrator 100.

By means of arranging the above integrator 100 in the storage device, various I/O devices to be connected with the server 200 in the traditional solution only need to be connected to the integrator 100 described herein to achieve the same function.

On the one hand, the originally limited number of ports of the server 200 are released to a great extent, and only one port is needed to be occupied to connect with the integrator 100. This does not only make it unnecessary to plug I/O cards or devices that support various protocols inside the server, releasing the crowded space of the server 200, but also significantly increases air circulation and improves heat dissipation. Besides, as the plugged I/O cards or devices would also release a large amount of heat, when it is unnecessary to plug more devices, the temperature problem of the server 200 and the storage device inside is resolved significantly.

On the other hand, with this integrator 100, the server 200 in the same storage device can exchange data directly through the integrator 100, thereby improving data exchange efficiency. Moreover, for the I/O device that monopolizes the port or server 200, it may be connected in the corresponding I/O part of the integrator 100 so that it will not monopolize the originally limited ports or server 200, which also further improves the utilization rate of the server 200 and the ports thereon. In some embodiments, in addition to the ports for connecting the integrator 100, there are still other ports in server 200 that may be used to connect the I/O device while maintaining the thermal density and space.

The type and number of the first and second interfaces 109, 110 on the base board 101 may be varied based on different application requirements and designs. In some embodiments, the connector 102 and I/O part 104 may be plugged directly on the first and second interfaces 109, 110. In some embodiments, the first and second interfaces 109, 110 may be plugged detachably on the interface provided on the back plate on the base board 101. In this embodiment, efficient adjustment of interface type and number can be accomplished merely by using different types of back plate or back plates with different number of interfaces. It is to be understood that in some embodiments, the connector 102 and the I/O part 104 may also be coupled with the first and second interfaces 109, 110 of the base board 101 in any other proper manner, such as directly though welding.

In some embodiments, the above components of the integrator 100 may be arranged in the integrator case 108, as illustrated in FIG. 2. In some embodiments, the integrator case 108 may be shaped as a cuboid, which enables the integrator case 108 to be disposed in the storage device more easily and space-efficiently. Of course, this is not compulsory and in other embodiments, any shape that can accommodate the above components of the integrator 100 may be used. Furthermore, it is to be understood that the integrator case 108 is not compulsory to be used and the above components of the integrator 100 may be arranged in any proper position in the storage device through the base board 101.

The integrator 100 may be arranged in any position in the storage device, for example, the plurality of integrator cases 108 may be stacked in an upper partition of the rack. This arrangement makes heat distribution in the storage device more balanced. In some embodiments, the integrator 100 may be disposed outside the storage device.

In some embodiments, the connector 102 can support PCIe protocol which is a common and universal connection interface of server 200 at present. Due to the use of the central processing unit (CPU) in the server at present, the server 200 has ports that support the protocol. Thus, the universality of the integrator 100 is improved: as long as a common and appropriate connection means in the art is provided, the integrator 100 may be connected to the server 200 simply so as to expand the ports of the server 200.

The customary devices supporting PCIe protocol at present comprise, for instance, SLIC and a 2.5-inch PCIe plate. Therefore, the user can use different back plates based on different needs so as to use SLIC or 2.5-inch PCIe plate respectively as connector 102. Besides, SLIC and 2.5-inch PCIe plate each also supports different transmission speeds, for instance, SLIC supports a PCIe transmission speed with a bus width of ×8 and ×16 while the 2.5-inch PCIe plate supports a transmission speed with a bus width of ×4, ×8 and ×16. Hence, the user may use the same interface to couple with SLIC or PCIe board having different speeds so as to connect the connector 102 having multiple speeds with the server 200 to meet different requirements of the user.

Figure 3:
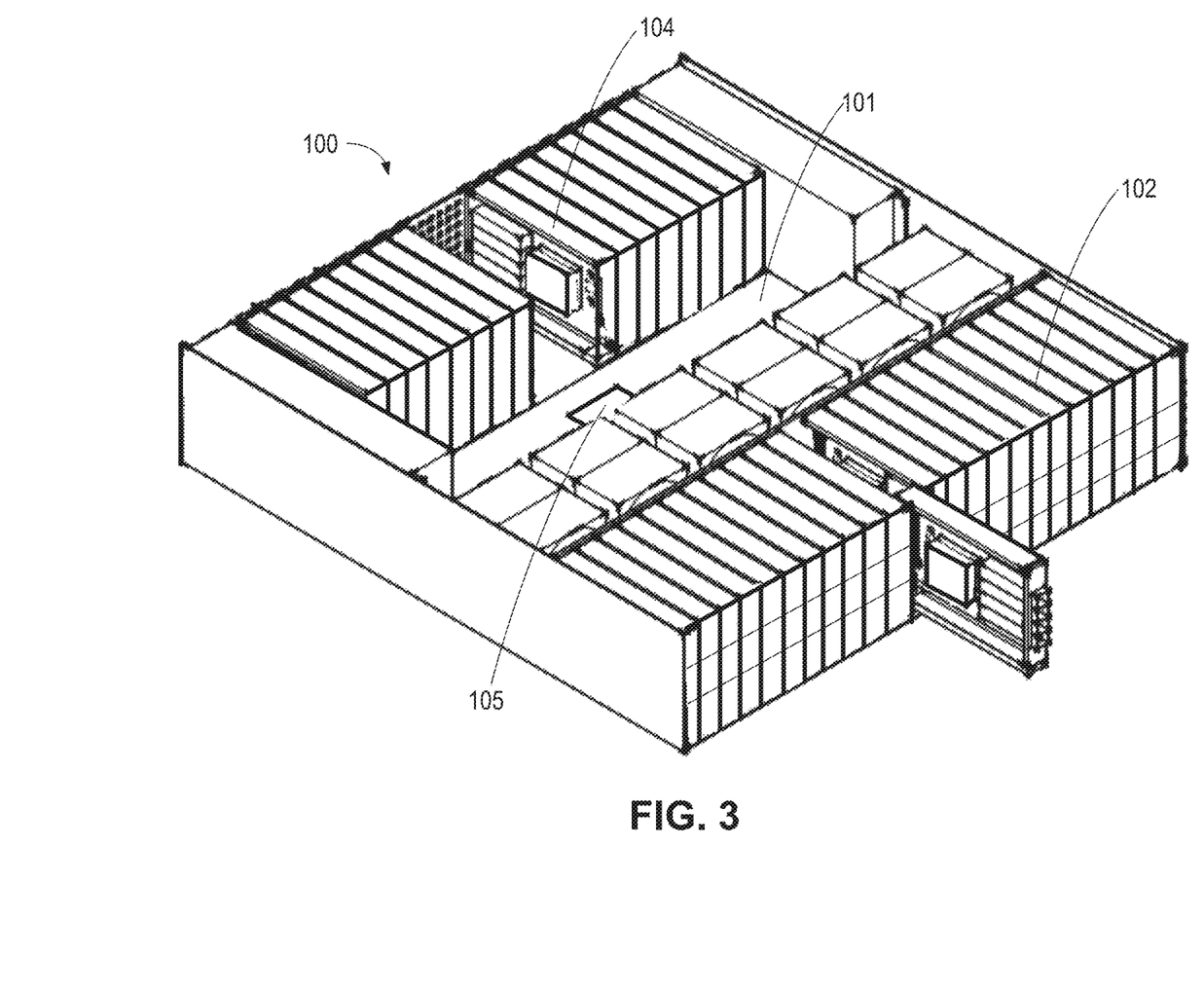
FIG. 3 shows a perspective view of an integrator in accordance with another embodiment of the present disclosure.

Moreover, as described above, the user may also adjust the number of ports provided by the connector 102 as needed. For example, FIGS. 1 and 2 show an integrator 100 plugged with twelve SLICs as connector 102 while FIG. 3 shows an integrator 100 plugged with twenty-four 2.5-inch PCIe plates. The twelve SLICs shown in FIGS. 1 and 2 may have different speeds. Similarly, the PCIe plate illustrated in FIG. 3 may also have different speeds. It is to be understood that the SLIC and PCIe plate depicted above as connector 102 are only illustrative and any other appropriate type devices that support PCIe protocol may be used as the connector 102 to be connected with the server 200.

In some embodiments, the I/O part 104 may support any suitable protocol, comprising but not limited to, PCIe protocol, Ethernet protocol, Serial SCSI (SAS) protocol, Fiber Channel (FC) protocol, Infiniband (IB) protocol, small input/output card (SLIC) protocol and non-volatile memory (NVME) protocol.

As depicted above, in some embodiments, the coupling between the I/O part 104 and the second interface of the base board 101 may also be by plugging. The user may use different back plates to support I/O devices of different protocols. For example, any combination that supports the above protocols may be used as the I/O part 104, which may be accomplished simply by using different back plates. The feature of the first and second interfaces 109, 110 of plugging different I/O devices by changing different back plates enables the integrator 100 to be adjusted based on various conditions.

By enabling the I/O part 104 to support various protocols, it is possible to support more I/O devices 300 without increasing the number of ports of the server 200. For I/O devices that monopolize interface or server 200, it is only necessary to incorporate several I/O cards or devices that support the protocol in the I/O part 104 as needed. This allows the originally monopolized server 200 or the originally monopolized ports on the server 200 to be released, so that the server 200 or the port can be applied to other I/O devices, which improves the utilization rate of the server 200 and its port.

In some embodiments, the switcher 105 on the base board 101 utilizes a PCIe switch chip. The number of the PCIe switch chips may be set to one or more as needed. In the schematic diagram shown in FIG. 4, the number of the provided PCIe switch chips is four. In some embodiments, a non-transparent bridge (NTB) is used between PCIe switch chips for data switch.

Examples of connection of the integrator 100 in different embodiments will be described below with reference to FIG. 4. In some embodiments, the servers 200 in the same storage device may be connected via a link 401 which starts from the PCIe port of the A server 200 through the connector 102, the first interface 109, PCIe switch chip, the second interface 110 and I/O part 104 to the PCIe port of B server 200. As the same protocol is supported, and the exchange efficiency of the PCIe switch chip is extremely high, high-bandwidth transmission between servers in the same storage device is realized, thereby simplifying the connection between servers 200 and improving connection efficiency.

In some embodiments, for instance, the standard serial connected small computer system interface (SAS) disk array enclosure (DAE) or non-volatile memory express (NVME) disk cluster (JBOF) described above may be connected with the server 200 by monopolizing the I/O device 300 of the server 200. As can be seen from FIG. 4, this kind of I/O device 300 is connected with the server 200 via a link 402 or 403. This makes the device 300 no longer able to monopolize the individual server 200 and the device only needs to be connected to the corresponding ports of the I/O part 104. Moreover, in the traditional solutions, this kind of I/O device 300 that monopolizes the server 200 generally only exchanges data with one server 200 in the storage device. Through the above link of the present disclosure, various I/O devices 300 may exchange data with all the servers 200 inside the storage device through the integrator 100, which improves the utilization rate of the port.

The links 402 and 404 shown in FIG. 4 illustrate the connection manner of some other embodiments. A plurality of different I/O devices 300 may exchange data with the same server through different links 402 and 404, which improves the utilization rate of the server 200 and the bandwidth. In some embodiments, the same I/O device 300 or different I/O devices 300 may exchange data with a plurality of different servers 200, as shown by links 403 and 404 in FIG. 4. In these embodiments, the utilization rate of the bandwidth is improved significantly, thereby further improving the efficiency of data transmission and switch.

It is to be understood that the server 200 or I/O device 300 in one of storage devices may exchange data with other storage devices or other storage systems via the integrator 100 of the present disclosure through an appropriate method, such as optical fiber, Ethernet and so on. The formed links are similar to those discussed above, while only the connection is changed to the connection between storage devices or between storage systems.

Referring back to FIG. 1, in some embodiments, the integrator 100 can further have a heat radiator for dissipating heat for the integrator 100. In the embodiment where an integrator case 108 (see FIG. 2) is used, the heat radiator may be located within or at the end of the integrator case. In some embodiments, the heat radiator may be a fan and correspondingly, an air inlet and an air outlet may be disposed on the integrator case 108. The fan can accelerate air circulation between the integrator 100 and the outside so as to achieve the purpose of dissipating heat for the integrator 100. In some embodiments, the heat radiator may be cooling fins disposed on the switcher 105.

In some embodiments, a power supply module can be arranged on the integrator 100 for supplying power to various components on the integrator 100. In some embodiments, the integrator 100 may also be powered with an external power supply. Then, it is also possible that the integrator 100 does not comprise a power supply module.

In some embodiments, the storage device may be a rack or any other appropriate storage device. The storage device comprises a plurality of servers 200, a plurality of I/O devices 300 and one or more integrators 100 as described above. In some embodiments, the storage device comprises a heat dissipating component, such as a fan, to dissipate heat for servers 200, I/O device 300 and integrator 100 in the storage device.

In some embodiments, the storage devices described above may form a storage system together. For example, in some embodiments, the storage devices in the storage system may be connected with each other through any appropriate means, such as optical fiber. As described above, the server 200 in a storage device may exchange data with other storage devices or even server 200 or I/O device 300 in the other storage systems via an integrator 100 and I/O device 300.

Figure 5:
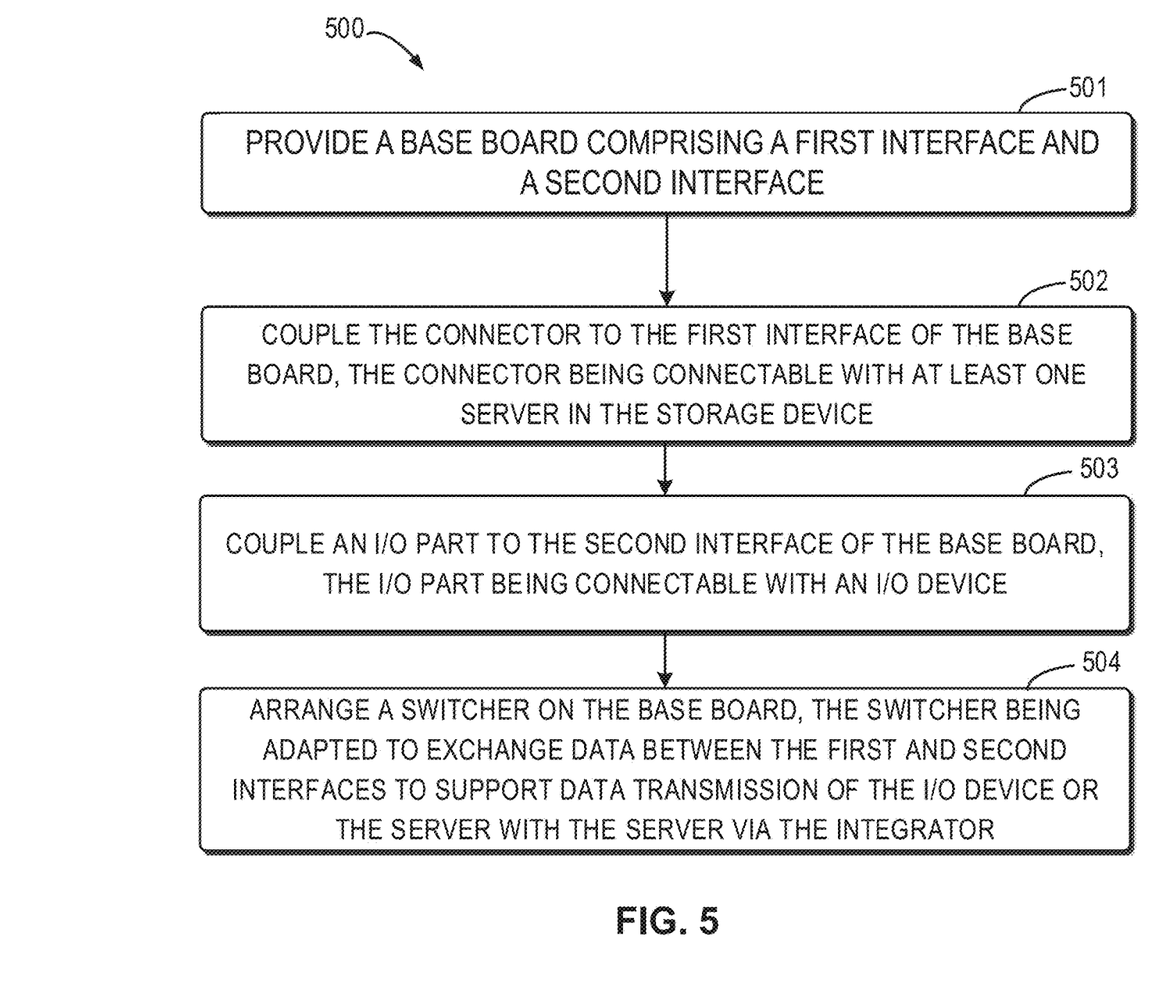
FIG. 5 shows a flow block diagram illustrating a method for manufacturing an integrator for a storage device in accordance with example embodiments of the present disclosure.

Referring to FIG. 5 which shows a flow block diagram 500 illustrating a method for manufacturing an integrator for the above storage device in accordance with example embodiments of the present disclosure. As shown in block 501, firstly, the base board 101 comprising the first and second interfaces 109, 110 is provided. In some embodiments, the provided base board 101 may further comprise other types of interfaces. As illustrated in block 502, the connector 102 is then coupled on the first interface 109 of the base board 101. The connector 102 can be connected with at least one server 200 in the storage device. As shown in block 503, the second interface 110 of the base board 101 is coupled with the I/O part 104 which can be connected with the I/O device 300 in the storage device or in the other storage devices.

The manufacturing method further comprises arranging the switcher 105 on the base board 101, as illustrated in block 504. The switcher 105 can further exchange data between the first and second interfaces 109, 110 so that I/O device 300 or server 200 in the above storage device or in the other storage devices can transmit data with the server 200 connected with the integrator 100. It is to be understood that the steps in the manufacturing method corresponding to blocks 502-504 may be performed in other orders, for example, it is possible to dispose the switcher 105 first after the base board 101 is provided and then couple the connector 102 and I/O part 104.

Though some specific embodiments of the present disclosure are illustrated in detail with examples, it is to be understood that the above example schematic diagrams are only illustrative, rather than to limit the scope of the present disclosure. It is to be understood by those skilled in the art that the above embodiments may be modified without departing from the scope and essentials of the present disclosure. The scope of the present disclosure is defined by the appended claims.

In the specification and the following claims, unless indicated in the context otherwise, the terms "comprise" and "comprise" are to be read as comprising the indicated components or groups of components, but not excluding any other components or groups of components.

Reference to any prior art in the present specification is not and should not be deemed as admitting that the prior art forms common knowledge.

It is to be understood that the following claims are only temporary claims and examples of possible claims and do not intend to limit the scope of the claims to any future patent application based on the present application. It is possible to add or delete components in the future example claims to further define or re-define the present disclosure.

We claim:

1. An integrator for a storage device, comprising:
   a base board comprising a first interface and a second interface;
   one or more connectors coupled to the first interface of the base board, the one or more connectors being connectable with a set of multiple servers in the storage device;
   one or more input/output (I/O) parts coupled to the second interface of the base board and connectable with first and second I/O devices of different types; and
   a switcher arranged on the base board and adapted to exchange data between the first and second interfaces to support data transmission of the first and second I/O devices with the set of multiple servers via the integrator;
   wherein the integrator is deployed in a separate integrator chassis relative to the set of multiple servers and the first and second I/O devices, the set of multiple servers and the first and second I/O devices thereby being deployed external to the integrator chassis.

2. The integrator of claim 1, wherein the one or more connectors are compliant with Peripheral Component Interconnect Express (PCIe) protocol.

3. The integrator of claim 2, wherein the one or more input/output (I/O) parts are compliant with at least one of the following protocols: PCIe protocol, Ethernet protocol, Serial SCSI (SAS) protocol, Fiber Channel (FC) protocol, Infiniband (IB) protocol, small input/output card (SLIC) protocol and non-volatile memory express (NVME) protocol.

4. The integrator of claim 1, wherein the switcher comprises a plurality of PCIe switch chips.

5. The integrator of claim 4, wherein the data is exchanged between the PCIe switch chips via a non-transparent bridge (NTB).

6. The integrator of claim 1, further comprising a heat radiator (107) for dissipating heat for the integrator.

7. The integrator of claim 1, further comprising a power supply module coupled to the base board for powering the integrator.

8. A storage device, comprising:
   a set of multiple servers;
   first and second I/O devices of different types; and an integrator comprising:

a base board comprising a first interface and a second interface;

one or more connectors coupled to the first interface of the base board, the one or more connectors being connectable with the set of multiple servers in the storage device;

one or more input/output (I/O) parts coupled to the second interface of the base board and connectable with the first and second I/O devices; and a switcher arranged on the base board and adapted to exchange data between the first and second interfaces to support data transmission of the first and second I/O devices with the set of multiple servers via the integrator;

wherein the integrator is deployed in a separate integrator chassis relative to the set of multiple servers and the first and second I/O devices, the set of multiple servers and the first and second I/O devices thereby being deployed external to the integrator chassis.

9. A method for manufacturing an integrator for a storage device, comprising:

providing a base board comprising a first interface and a second interface;

coupling one or more connectors to the first interface of the base board, the one or more connectors being connectable with a set of multiple servers in the storage device;

coupling one or more input/output (I/O) parts to the second interface of the base board, the one or more input/output (I/O) parts (being connectable with first and second I/O devices of different types; and arranging a switcher on the base board, the switcher being adapted to exchange data between the first and second interfaces to support data transmission of the first and second I/O devices with the set of multiple servers via the integrator;

wherein the integrator is deployed in a separate integrator chassis relative to the set of multiple servers and the first and second I/O devices, the set of multiple servers and the first and second I/O devices thereby being deployed external to the integrator chassis.

10. The integrator of claim 1, wherein at least one of the first and second I/O devices comprises at least one of a storage array enclosure and a non-volatile memory cluster.

11. The integrator of claim 1, wherein the one or more connectors comprise one or more removable connectors.

12. The integrator of claim 1, wherein the one or more connectors are connectable with the set of multiple servers by wire or wirelessly.

13. The integrator of claim 1, wherein the one or more connectors comprise a plurality of connectors and the one or more input/output (I/O) parts comprise a plurality of input/output (I/O) parts.

14. The storage device of claim 8, wherein at least one of the first and second I/O devices comprises at least one of a storage array enclosure and a non-volatile memory cluster.

15. The storage device of claim 8, wherein the one or more connectors comprise one or more removable connectors.

16. The storage device of claim 8, wherein the one or more connectors are connectable with the set of multiple servers by wire or wirelessly.

17. The storage device of claim 8, wherein the one or more connectors comprise a plurality of connectors and the one or more input/output (I/O) parts comprise a plurality of input/output (I/O) parts.

18. The method of claim 9, wherein at least one of the first and second I/O devices comprises at least one of a storage array enclosure and a non-volatile memory cluster.

19. The method of claim 9, wherein the one or more connectors comprise one or more removable connectors.

20. The method of claim 9, wherein the one or more connectors comprise a plurality of connectors and the one or more input/output (I/O) parts comprise a plurality of input/output (I/O) parts.

* * * * *

UNITED STATES PATENT AND TRADEMARK OFFICE
CERTIFICATE OF CORRECTION

PATENT NO. : 10,635,320 B2
APPLICATION NO. : 16/171958
DATED : April 28, 2020
INVENTOR(S) : Haifang Zhai et al.

Page 1 of 1

It is certified that error appears in the above-identified patent and that said Letters Patent is hereby corrected as shown below:

In the Claims

Column 9, Claim 9, Line 31, please delete "(being" and insert therefor --being--

Signed and Sealed this
Twenty-sixth Day of May, 2020

Andrei Iancu
*Director of the United States Patent and Trademark Office*